US011869492B2

(12) United States Patent
Purohit et al.

(10) Patent No.: US 11,869,492 B2
(45) Date of Patent: Jan. 9, 2024

(54) ANOMALY DETECTION SYSTEM AND METHOD USING NOISE SIGNAL AND ADVERSARIAL NEURAL NETWORK

(71) Applicant: HITACHI, LTD., Tokyo (JP)

(72) Inventors: Harsh Pramodbhai Purohit, Tokyo (JP); Takashi Endo, Tokyo (JP); Yohei Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 233 days.

(21) Appl. No.: 17/469,514

(22) Filed: Sep. 8, 2021

(65) Prior Publication Data

US 2022/0208184 A1   Jun. 30, 2022

(30) Foreign Application Priority Data

Dec. 25, 2020   (JP) .................................. 2020-216561

(51) Int. Cl.
| | |
|---|---|
| *G05B 23/02* | (2006.01) |
| *G10L 15/20* | (2006.01) |
| *G10L 15/02* | (2006.01) |
| *G06N 3/08* | (2023.01) |
| *G10L 17/18* | (2013.01) |
| *G10L 25/78* | (2013.01) |

(52) U.S. Cl.
CPC ............ *G10L 15/20* (2013.01); *G05B 23/024* (2013.01); *G06N 3/08* (2013.01); *G10L 15/02* (2013.01); *G10L 17/18* (2013.01); *G10L 2025/783* (2013.01)

(58) Field of Classification Search
None
See application file for complete search history.

(56) References Cited

U.S. PATENT DOCUMENTS 10,733,733 B1   8/2020 Nam
11,087,215 B1 *  8/2021 Chen ........................ G06N 3/08
(Continued)

OTHER PUBLICATIONS

Weltner et al. 'Mathematics for Physicists and Engineers' pp. 1-17, Springer, published 2014.*
(Continued)

*Primary Examiner* — Bernard G Lindsay
(74) *Attorney, Agent, or Firm* — Volpe Koenig

(57) ABSTRACT

An anomaly detection apparatus includes a device identification database that stores device identification information for identifying a specific device for each type of a device, a hierarchical conditional vector generation unit that generates a hierarchical conditional vector based on the device identification information, an extraction unit that extracts a target device feature amount vector indicating a feature amount of an acoustic signal acquired from a target device by analyzing the acoustic signal, a hierarchical condition adversarial neural network that outputs background noise level information indicating a background noise level of a surrounding environment of the target device and true/false determination information indicating true/false of the target device feature amount vector by analyzing the hierarchical conditional vector and the target device feature amount vector, and an anomaly determination unit that determines whether an anomaly exists in the target device feature amount vector.

11 Claims, 13 Drawing Sheets

(56) References Cited

U.S. PATENT DOCUMENTS

| | | | | |
|---|---|---|---|---|
| 2003/0061868 A1* | 4/2003 | Povey | ................... | G01N 29/221 |
| | | | | 73/602 |
| 2020/0342306 A1* | 10/2020 | Giovannini | .............. | G06N 3/08 |
| 2021/0141986 A1* | 5/2021 | Ganille | ................... | G06Q 50/30 |
| 2021/0275147 A1* | 9/2021 | Ota | ......................... | G06N 3/084 |
| 2022/0138506 A1* | 5/2022 | Elenes | ................... | G06V 10/82 |
| | | | | 382/157 |
| 2023/0057612 A1* | 2/2023 | Byun | ................... | G06V 10/774 |

OTHER PUBLICATIONS

Zhang et al. 'Machinery fault diagnosis with imbalanced data using deep generative adversarial networks' Measurement 152 (2020) 107377, Elsevier, published Dec. 14, 2019.*

Wang et al. 'An intelligent diagnosis scheme based on generative adversarial learning deep neural networks and its application to planetary gearbox fault pattern recognition' Neurocomputing 310 (2018) 213-222, Elsevier, published 2018.*

* cited by examiner

ANOMALY DETECTION SYSTEM AND METHOD USING NOISE SIGNAL AND ADVERSARIAL NEURAL NETWORK

CROSS-REFERENCE TO RELATED APPLICATIONS

The present application claims priority to Japanese Patent Application No. 2020-216561, filed on Dec. 25, 2020. The contents of this application are incorporated herein by reference in their entirety.

BACKGROUND OF THE INVENTION

1. Field of the Invention

The present disclosure relates to anomaly detection apparatus, an anomaly detection method, and an anomaly detection system.

2. Description of the Related Art

In order to maintain an operation rate of various devices disposed in a facility such as a factory or a data center and to prolong the life, it is important to determine the presence or absence of anomaly of each device early and accurately. Then, as one of means for detecting anomaly of a device, it is known to analyze an acoustic signal generated from a fan or a motor of a verification target device.

As one of methods for analyzing signals, so-called Generative Adversarial Networks (GAN) can be used. The GAN is a machine learning means configured by an architecture that causes two neural networks to compete with each other to deepen learning of input data. According to the GAN, various discrimination tasks can be performed with high accuracy in a wide range of fields.

For example, U.S. Ser. No. 16/535,277 A discloses a technology in which "an anomaly detection method, a device, and a system thereof capable of improving accuracy and reliability of a detection result using Generative Adversarial Networks (GAN). An anomaly detection apparatus according to some embodiments of the present disclosure can include: a memory that stores a GAN-based image conversion model and an anomaly detection model, and a processor that converts a learning image with a low difficulty level into a learning image with a high difficulty level by using the image conversion model, and causes the anomaly detection model to learn by using the converted learning image. It is possible to improve detection performance of the anomaly detection apparatus by causing the anomaly detection model to learn in a learning image having a high difficulty level in which anomaly detection is difficult."

SUMMARY OF THE INVENTION

U.S. Ser. No. 16/535,277 A discloses a means for detecting an anomaly (for example, a lesion or the like) in an image by using Generative Adversarial Networks (GAN). However, the means described in U.S. Ser. No. 16/535,277 A focuses on adapting the GAN to image processing, and is not assumed to be applied to anomaly detection in an acoustic signal. Therefore, highly accurate anomaly detection for an acoustic signal cannot be expected.

Therefore, an object of the present disclosure is to provide an anomaly detection means having high robustness by using the GAN for a device that has generated an acoustic signal.

According to an aspect of the present invention, there is provided an anomaly detection apparatus including: a device identification database that stores device identification information for identifying a specific device for each type of a device; a hierarchical conditional vector generation unit that generates a hierarchical conditional vector based on the device identification information; an extraction unit that extracts a target device feature amount vector indicating a feature amount of an acoustic signal acquired from a target device that is a device of an anomaly detection target by analyzing the acoustic signal; a hierarchical condition adversarial neural network that outputs background noise level information indicating a background noise level of a surrounding environment of the target device and true/false determination information indicating true/false of the target device feature amount vector by analyzing the hierarchical conditional vector and the target device feature amount vector, and an anomaly determination unit that determines an anomaly score indicating a probability that an anomaly exists in the target device based on the background noise level information and the true/false determination information.

According to the present invention, it is possible to provide an anomaly detection means having high robustness by using Generative Adversarial Networks (GAN) for a device that has generated an acoustic signal.

Problems, configurations, and effects other than those described above will be clarified by the following description of embodiments for carrying out the invention.

DESCRIPTION OF THE PREFERRED EMBODIMENTS

Figure 1:
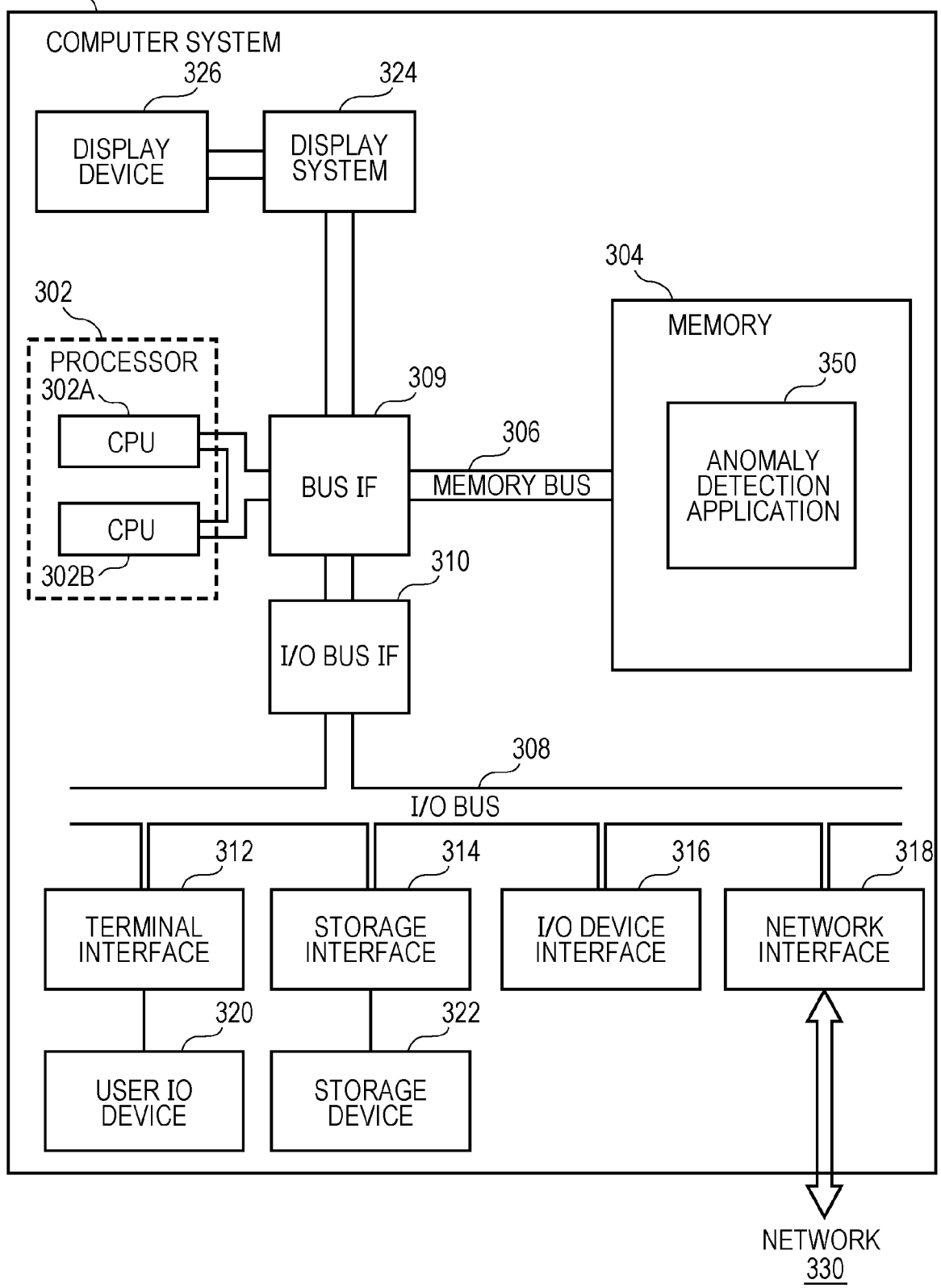
FIG. 1 is a block diagram of a computer system for implementing one embodiment of the present invention.

Hereinafter, embodiments of the present invention will be described in detail with reference to the drawings. Note that the present invention is not limited by the embodiments. Moreover, in the drawings, the same portions are denoted by the same reference numerals.

Accuracy of anomaly detection for acoustic signals depends on many factors. For example, since sound generated differs depending on a type of a verification target device, it is desirable to consider information indicating a type (fan, pump, valve, and the like) of a device that has generated an acoustic signal when analyzing the acoustic signal. Furthermore, since a background noise (operating noise of other devices, human voice, noise caused by traffic, or the like) in an environment in which the verification target device is disposed also affects the determination of the acoustic signal, it is important to set an optimum anomaly determination threshold corresponding to a background noise level in the surrounding environment of the verification target device.

That is, it is important to consider on the premise that the accuracy of anomaly detection with respect to the acoustic signal depends on various factors such as, for example, device identification information indicating the type of the verification target device and background noise information indicating a level of a background noise of the environment in which the verification target device is disposed.

However, in the conventional anomaly detection means for a machine learning-based acoustic signal, a neural network is trained only by a normal acoustic signal, and the type of the verification target device, the background noise of the environment in which the verification target device is disposed, and the like are not considered. Therefore, when the neural network trained in this manner is applied to the anomaly detection of the actual acoustic signal, a separate noise suppression means is required, and thus, the anomaly detection accuracy in the field is limited.

Therefore, in order to solve the above problem, an anomaly detection apparatus according to one embodiment of the present disclosure includes a hierarchical condition adversarial neural network having a generation network that generates a false vector approximating an acoustic signal acquired from a verification target device, and an identification network that determines true/false of an input vector and determines a level of a background noise in an environment in which the verification target device is disposed. This hierarchical condition adversarial neural network is trained based on a target device feature amount vector indicating a feature amount of an acoustic signal acquired from a device, and a hierarchical conditional vector including type information indicating a type of the device and identifier information indicating an identifier of the device.

In this way, by using the hierarchical conditional vector that includes information on the device, the generation network is trained to generate false vectors that are more similar to a true acoustic signal, and the identification network is trained to perform more accurate anomaly detection.

First, a computer system 300 for implementing embodiments of the present disclosure will be described with reference to FIG. 1. The mechanisms and devices of the various embodiments disclosed herein may be applied to any suitable computing system. Main components of the computer system 300 include one or more processors 302, memory 304, a terminal interface 312, a storage interface 314, an I/O (input/output) device interface 316, and a network interface 318. These components may be interconnected via a memory bus 306, an I/O bus 308, a bus interface unit 309, and an I/O bus interface unit 310.

The computer system 300 may include one or more general purpose programmable central processing units (CPU) 302A and 302B, collectively referred to as processors 302. In one embodiment, the computer system 300 may include multiple processors, and in another embodiment, the computer system 300 may be a single CPU system. Each processor 302 executes instructions stored in memory 304 and may include an on-board cache.

In one embodiment, the memory 304 may include a random access semiconductor memory, storage device, or storage medium (either volatile or non-volatile) for storing data and programs. The memory 304 may store all or part of programs, modules, and data structures that implement the functions described herein. For example, the memory 304 may store an anomaly detection application 350. In one embodiment, the anomaly detection application 350 may include instructions or descriptions that perform functions described below on the processor 302.

In one embodiment, the anomaly detection application 350 may be implemented in hardware via semiconductor devices, chips, logic gates, circuits, circuit cards, and/or other physical hardware devices instead of or in addition to a processor-based system. In one embodiment, the anomaly detection application 350 may include data other than instructions or descriptions. In one embodiment, a camera, sensor, or other data input device (not shown) may be provided to communicate directly with the bus interface unit 309, the processor 302, or other hardware of the computer system 300.

The computer system 300 may include the bus interface unit 309 that performs communications between the processor 302, the memory 304, the display system 324, and the I/O bus interface unit 310. The I/O bus interface unit 310 may be coupled with the I/O bus 308 for transferring data to and from various I/O units. The I/O bus interface unit 310 may communicate with a plurality of I/O interface units 312, 314, 316, and 318, also known as I/O processors (IOP) or I/O adapters (IOA), via the I/O bus 308.

The display system 324 may include a display controller, a display memory, or both. The display controller may provide video, audio, or both data to a display device 326. The computer system 300 may also include devices, such as one or more sensors, configured to collect data and provide the data to the processor 302.

For example, the computer system 300 may include a biometric sensor that collects heart rate data, stress level data, and the like, an environment sensor that collects humidity data, temperature data, pressure data, and the like, a motion sensor that collects acceleration data, motion data, and the like, and the like. Other types of sensors can also be used. The display system 324 may be connected to the display device 326 such as a single display screen, television, tablet, or portable device.

The I/O interface unit has a function of communicating with various storage or I/O devices. For example, the terminal interface unit 312 can attach a user I/O device 320 such as a user output device such as a video display device or a speaker television, or a user input device such as a keyboard, a mouse, a keypad, a touchpad, a trackball, a button, a light pen, or another pointing device. The user may use the user interface to operate a user input device to input input data and instructions to the user I/O device 320 and the computer system 300 and receive output data from the computer system 300. The user interface may be displayed on a display device, reproduced by a speaker, or printed via a printer, for example, via the user I/O device 320.

One or more disk drives or direct access storage devices 322 (typically a magnetic disk drive storage device, but may be an array of disk drives or other storage devices configured to appear as a single disk drive.) can be attached to the storage interface 314. In one embodiment, the storage device 322 may be implemented as any secondary storage device. The contents of the memory 304 may be stored in the storage device 322 and read from the storage device 322 as necessary. The I/O device interface 316 may provide an interface to other I/O devices, such as printers, fax machines, or the like. The network interface 318 may provide a communication path so that the computer system 300 and other devices can communicate with each other. This communication path may be, for example, the network 330.

In one embodiment, the computer system 300 may be a device that receives requests from other computer systems (clients) that do not have a direct user interface, such as a multi-user mainframe computer system, a single-user system, or a server computer. In other embodiments, the computer system 300 may be a desktop computer, a portable computer, a notebook computer, a tablet computer, a pocket computer, a phone, a smartphone, or any other suitable electronic device.

Next, a logical configuration of an anomaly detection system according to one embodiment of the present disclosure will be described with reference to FIG. 2.

Figure 2:
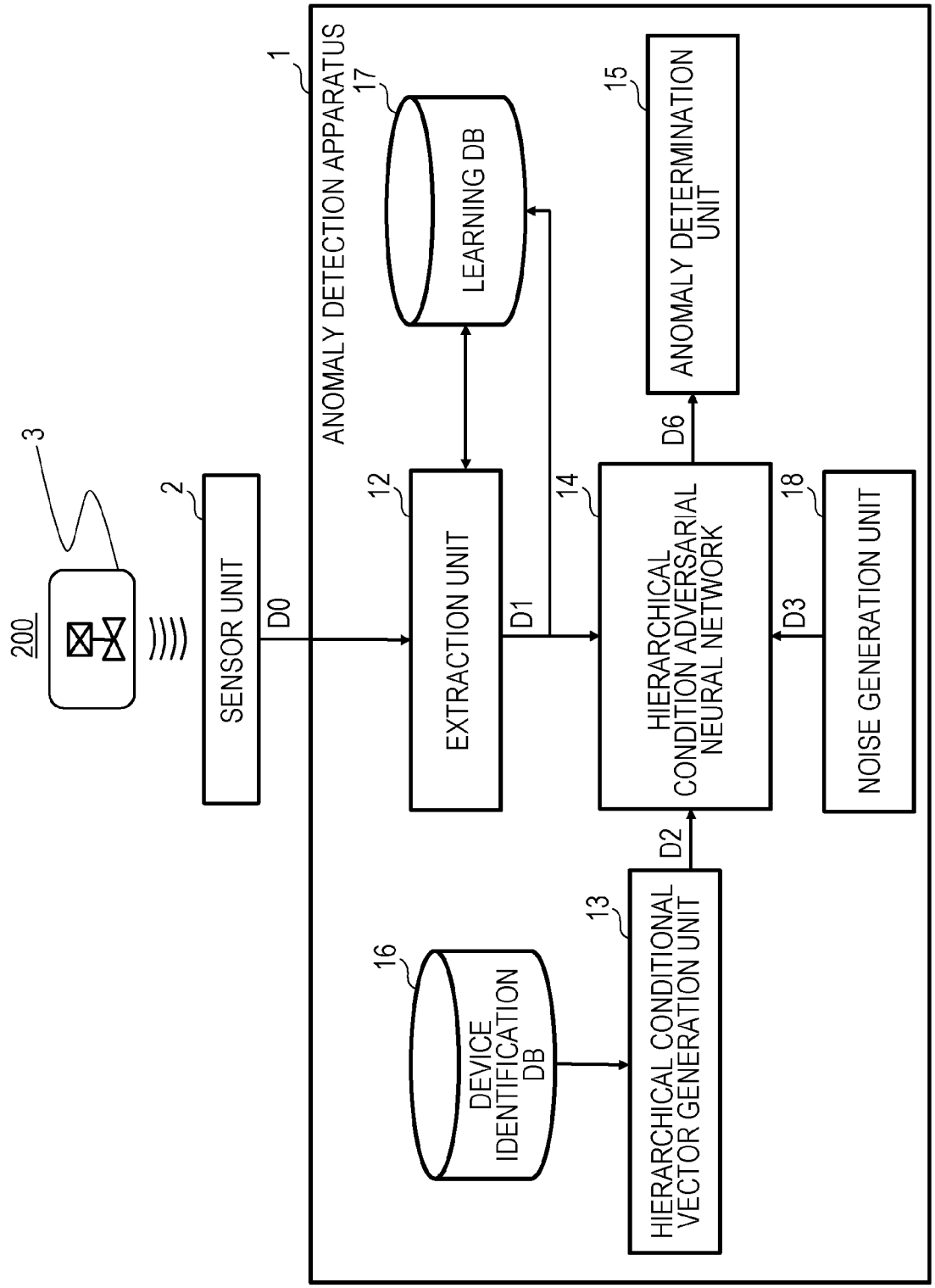
FIG. 2 is a diagram illustrating an example of a logical configuration of an anomaly detection system according to one embodiment of the present disclosure.

FIG. 2 is a diagram illustrating an example of a logical configuration of an anomaly detection system 200 according to one embodiment of the present disclosure. As described above, the anomaly detection system 200 according to one embodiment of the present disclosure is a system for performing anomaly detection with high robustness by using the hierarchical condition GAN considering the identification information regarding the device that has generated the acoustic signal and the information regarding a noise level of the environment in which the device is disposed.

As illustrated in FIG. 2, the anomaly detection system 200 according to one embodiment of the present disclosure mainly includes an anomaly detection apparatus 1, a sensor unit 2, and a target device 3. The anomaly detection apparatus 1, the sensor unit 2, and the target device 3 may be connected to each other via an arbitrary communication network such as a local area network (LAN) or the Internet.

The target device 3 is a device disposed in a facility such as a factory or a data center, and is a device that generates an acoustic signal to be subjected to anomaly detection processing. The target device 3 may be any device as long as the device generates an acoustic signal according to operation, such as a server disposed in a data center or a device disposed in a factory.

The sensor unit 2 is a sensor device for acquiring the acoustic signal from the target device 3. The sensor unit 2 may be, for example, a microphone or a recording device installed near or inside the target device 3. The sensor unit 2 may transmit the acoustic signal acquired from the target device 3 to the anomaly detection apparatus 1 as an acoustic signal D0 to be subjected to the anomaly detection processing.

As illustrated in FIG. 2, the anomaly detection apparatus 1 includes an extraction unit 12, a hierarchical conditional vector generation unit 13, a hierarchical condition adversarial neural network 14, an anomaly determination unit 15, a learning database (hereinafter, referred to as a "learning DB") 16, a device identification database (hereinafter, referred to as a "device identification DB") 17, and a noise generation unit 18.

The extraction unit 12 is a functional unit that extracts a target device feature amount vector D1 indicating a feature amount of the acoustic signal D0 by analyzing the acoustic signal D0 acquired from the target device 3. For example, the extraction unit 12 may extract a spectrogram (for example, Log-Mel Spectrogram) representing three dimensions of time, frequency, and intensity of a signal component as a feature of the acoustic signal D0 by passing the acoustic signal D0 acquired from the target device 3 through a window function to calculate a frequency spectrum. In one embodiment, the extraction unit 12 may acquire an algorithm and a parameter for extracting the target device feature amount vector D1 from the acoustic signal D0 from a learning DB 17. After extracting the target device feature amount vector D1, the extraction unit 12 transfers the target device feature amount vector D1 to the hierarchical condition adversarial neural network 14.

The learning DB 17 is a database for storing an algorithm and a parameter for extracting the target device feature amount vector D1 and a parameter for training the hierarchical condition adversarial neural network 14.

The device identification DB 16 is a database for storing identification information regarding various devices. For example, the device identification DB 16 may store device identification information for identifying a specific device for each type of predetermined device. As an example, the device identification DB 16 may store type information indicating a device type (fan, pump, valve, and the like) and identifier information (product number, model number, ID-N, or the like of specific device) indicating an identifier of the device.

The hierarchical conditional vector generation unit 13 is a functional unit that generates a hierarchical conditional vector D2 based on the device identification information stored in the device identification DB 16. In one embodiment, the hierarchical conditional vector generation unit 13 may generate the hierarchical conditional vector D2 by a one-hot vector generation means based on the device identification information stored in the device identification DB 16.

The hierarchical conditional vector D2 is a data structure including information related to a predetermined hierarchical condition (for example, the identification information of the device). By training the hierarchical condition adversarial neural network 14 using this hierarchical conditional vector, a more accurate latent space representation is possible and false vectors with a higher similarity to a true acoustic signal D0 can be generated.

Note that details of the configuration of the hierarchical conditional vector D2 will be described with reference to FIG. 6, and thus, the description thereof will be omitted here.

The noise generation unit 18 is a functional unit for generating a noise signal. In one embodiment, the noise generation unit 18 may generate a noise vector D3 based on a normal acoustic signal of a specific device (for example, a target device or the like). For example, the noise generation unit 18 may generate the noise vector D3 and input the noise vector D3 to the hierarchical condition adversarial neural network 14 described below. As described below, the hierarchical condition adversarial neural network 14 can generate a false vector approximating the target device feature amount vector D1 based on the noise vector D3 and the hierarchical conditional vector D2.

The hierarchical condition adversarial neural network 14 is a neural network that analyzes the hierarchical conditional vector D2 and the target device feature amount vector D1 to generate background noise level information indicating a background noise level of a surrounding environment of the target device and true/false determination information indicating true/false of the target device feature amount vector.

More specifically, the hierarchical condition adversarial neural network 14 includes a generation network that generates a false vector D6 approximating the target device feature amount vector D1 based on the hierarchical conditional vector D2 and the noise vector D3 generated based on a noise signal, and an identification network that performs true/false determination for determining true/false of the target device feature amount vector D1 and the false vector D6 to generate true/false determination information, and performs background noise determination for determining a background noise level to generate background noise level information.

In the training stage, the hierarchical condition adversarial neural network 14 is learned to minimize a cross-entropy loss by true/false determination and a cross-entropy loss by background noise determination. Neural network parameters for minimizing these losses are stored in the learning DB 17.

Furthermore, in the inference stage, it is possible to generate a highly accurate anomaly detection result by analyzing a predetermined acoustic signal using the trained hierarchical condition adversarial neural network 14.

Note that details of the configuration of the hierarchical condition adversarial neural network 14 will be described below, and thus the description thereof will be omitted here.

The anomaly determination unit 15 is a functional unit that determines whether an anomaly exists in the target device feature amount vector. In one embodiment, the anomaly determination unit 15 generates an anomaly detection result indicating whether the target device feature amount vector D1 is normal or abnormal based on an anomaly score $\varepsilon$ calculated by the trained generation network and an anomaly determination threshold determined by the trained identification network. The anomaly score here is a measure indicating a probability that an anomaly exists in the acoustic signal D0, and may be expressed as a numerical value within a range of 0 to 1, for example.

Next, a hardware configuration of the anomaly detection system 200 according to one embodiment of the present disclosure will be described with reference to FIG. 3.

Figure 3:
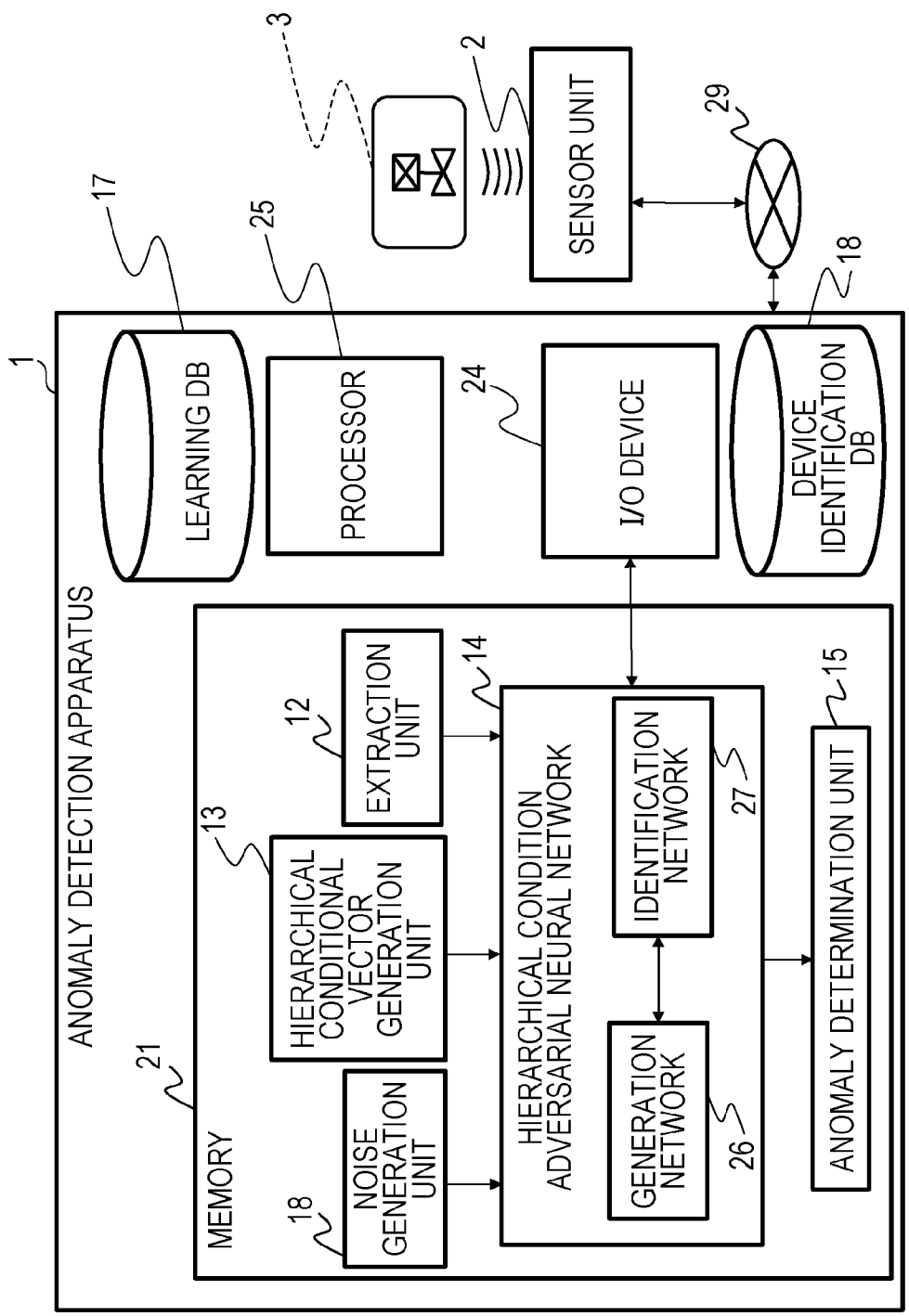
FIG. 3 is a diagram illustrating an example of a hardware configuration of an anomaly detection system according to one embodiment of the present disclosure.

FIG. 3 is a diagram illustrating an example of a hardware configuration of the anomaly detection system 200 according to one embodiment of the present disclosure. As described above, the anomaly detection system 200 according to one embodiment of the present disclosure mainly includes the anomaly detection apparatus 1, the sensor unit 2, and the target device 3. The anomaly detection apparatus 1, the sensor unit 2, and the target device 3 may be connected to each other via an arbitrary communication network 29 such as a local area network (LAN) or the Internet.

Note that, since each functional unit of the anomaly detection system 200 has been described above with reference to FIG. 2, redundant description is omitted here.

The anomaly detection apparatus 1 may be realized as a general computer device (for example, the computer system 300 described with reference to FIG. 1). For example, as illustrated in FIG. 3, the anomaly detection apparatus 1 includes a memory 21, a processor 25, and an I/O device 24.

The memory 21 may be any storage device such as a RAM, a flash memory, or a hard disk drive. As illustrated in FIG. 3, the memory 21 includes software modules for implementing the respective functions of the noise generation unit 18, the hierarchical conditional vector generation unit 13, the extraction unit 12, the hierarchical condition adversarial neural network 14, and the anomaly determination unit 15.

The processor 25 is, for example, one or more microprocessors, and executes commands of software modules stored in the memory 21.

The I/O device 24 may include, for example, a device for receiving a user input, such as a keyboard, a mouse, and a touch screen, and a device for outputting information, such as a display and a speaker.

As described above, according to the anomaly detection system 200 configured as described with reference to FIGS. 2 and 3, it is possible to provide an anomaly detection means having high robustness by using the hierarchical condition GAN considering the identification information regarding the device that has generated the acoustic signal and the information regarding the noise level of the environment in which the device is disposed.

Next, a generation network according to one embodiment of the present disclosure will be described with reference to FIG. 4.

Figure 4:
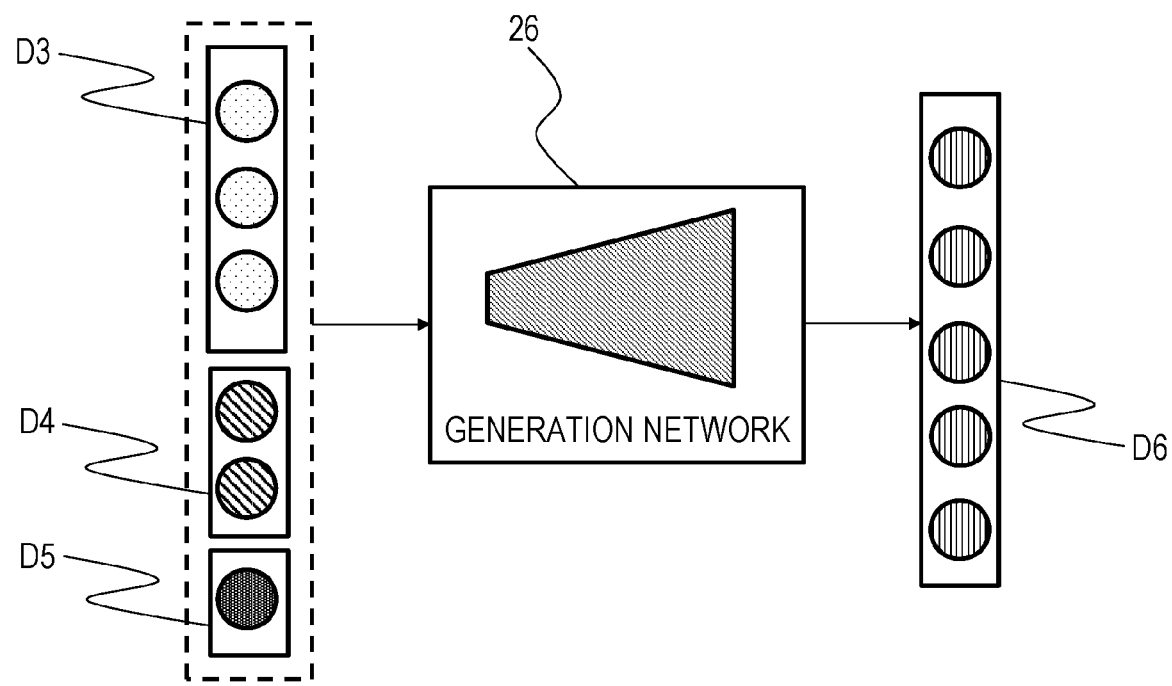
FIG. 4 is a diagram illustrating an example of a generation network according to one embodiment of the present disclosure.

FIG. 4 is a diagram illustrating an example of the generation network 26 according to one embodiment of the present disclosure. As described above, the generation network 26 according to one embodiment of the present disclosure is a generation network for generating the false vector D6 approximating the target device feature amount vector D1 (not illustrated in FIG. 4) which is a feature amount vector extracted from the acoustic signal of the target device.

As illustrated in FIG. 4, the generation network 26 inputs the noise vector D3 generated by the above-described noise generation unit (for example, the noise generation unit 18 illustrated in FIG. 2), a device type vector D4 including type information indicating a type of a device, and a device identification vector D5 including identifier information indicating an identifier of a device.

The generation network 26 generates the false vector D6 approximating the target device feature amount vector D1 based on the noise vector D3, the device type vector D4 including the type information indicating the type of the device, and the device identification vector D5 including the identifier information indicating the identifier of the device. As described below, the identification network performs true/false determination to determine true/false of the false vector D6 and the target device feature amount vector D1.

As described above, by inputting the device type vector D4 and the device identification vector D5 in addition to the noise vector D3 to the generation network 26, more accurate latent space representation is possible, and the generation network 26 can generate the false vector D6 closer to the target device feature amount vector D1. Moreover, as trained, the generation network 26 is learned to generate a false vector with a higher similarity to the target device feature amount vector D1.

Note that processing in the training stage and processing in the inference stage of the generation network 26 will be described below.

Next, an identification network according to one embodiment of the present disclosure will be described with reference to FIG. 5.

Figure 5:
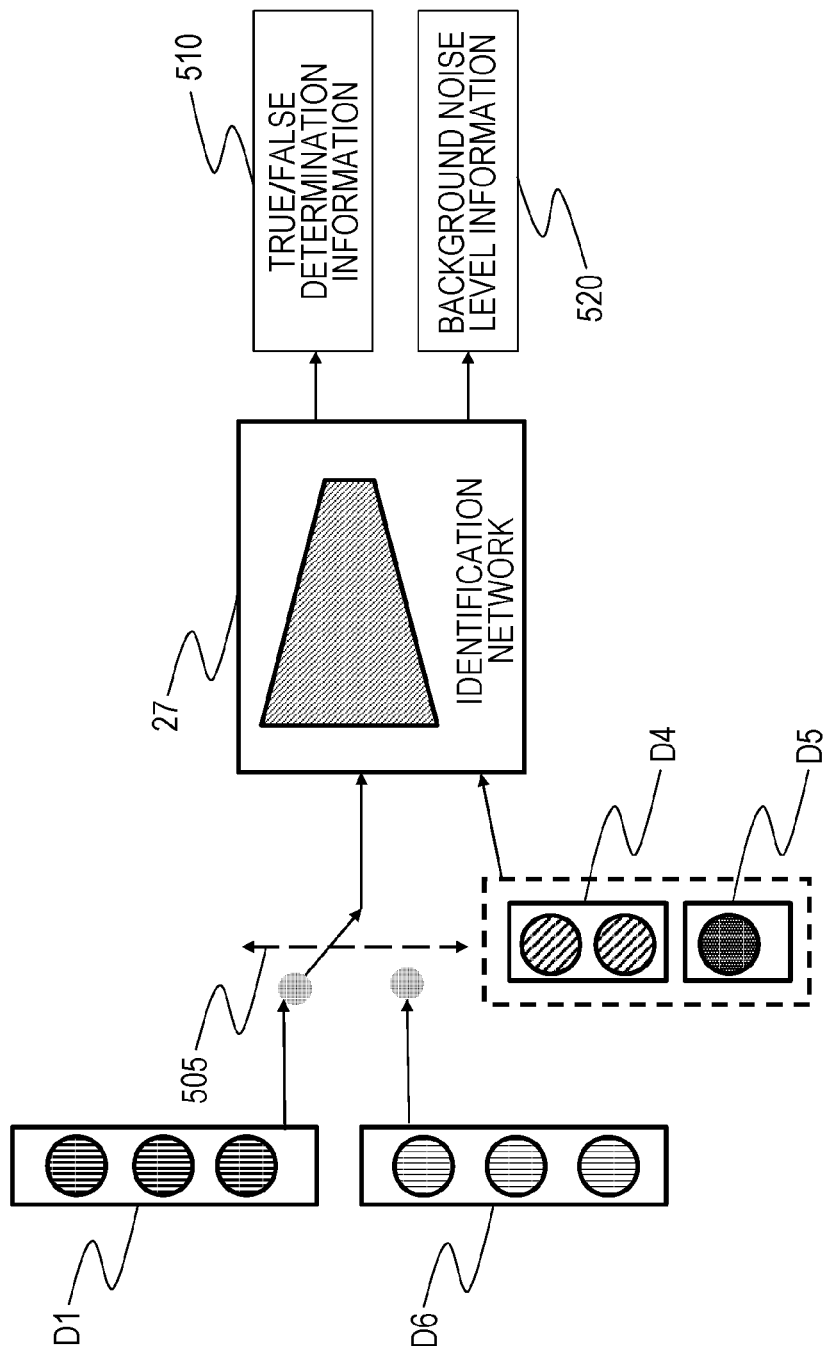
FIG. 5 is a diagram illustrating an example of an identification network according to one embodiment of the present disclosure.

FIG. 5 is a diagram illustrating an example of an identification network 27 according to one embodiment of the present disclosure. As described above, the identification network 27 according to one embodiment of the present disclosure is an identification network for performing true/false determination for determining true/false of the target device feature amount vector D1 and the false vector D6, generating true/false determination information 510, performing background noise determination for determining a background noise level, and generating background noise level information 520.

As illustrated in FIG. 5, the identification network 27 inputs the target device feature amount vector D1 indicating the feature amount of the acoustic signal acquired from the target device, the false vector D6 approximating the target device feature amount vector D1 generated by the generation network 26 described above, the device type vector D4 including the type information indicating the type of the device, and the device identification vector D5 including the identifier information indicating the identifier of the device.

Note that the identification network 27 does not simultaneously input the target device feature amount vector D1 and the false vector D6, and which vector is input may be controlled by a switch 505 illustrated in FIG. 5. The switch 505 is a switch that randomly determines whether the target device feature amount vector D1 from the extraction unit 12 is input to the identification network 27 or the false vector D6 from the generation network 26 is input.

The identification network 27 analyzes the input device type vector D4, the device identification vector D5, and the target device feature amount vector D1 or the false vector D6 to perform true/false determination on the target device feature amount vector D1 or the false vector D6, and generates true/false determination information 510.

The true/false determination here is processing of determining whether the target device feature amount vector D1 or the false vector D6 is true (that is, a true feature amount vector of the acoustic signal acquired from the target device) or false (that is, a false feature amount vector generated by the generation network). The result of the true/false determination is indicated in the true/false determination information 510.

As an example, the identification network 27 may output a vector indicating the result of the true/false determination in binary as the true/false determination information 510. For example, the identification network 27 may output, as the true/false determination information 510, a vector including "1" in a case where the target vector is determined to be "true", and a vector including "0" in a case where the target vector is determined to be "false".

In addition, the identification network 27 analyzes the input device type vector D4, the device identification vector D5, and the target device feature amount vector D1 or the false vector D6 to perform background noise determination on the target device feature amount vector D1 or the false vector D6, and generates the background noise level information 520.

The background noise herein means a sound generated from a generation source other than the target device, such as an operation sound of another device, a human voice, and a noise due to traffic, in an environment where the target device is disposed. Furthermore, the background noise determination here is processing of determining a level (degree) of background noise in the target device feature amount vector D1 or the false vector D6. A result of the background noise determination is indicated in the background noise level information 520.

As an example, the identification network 27 may classify the level of background noise in the target device feature amount vector D1 or the false vector D6 into any one of "$\Delta_1$: low" (for example, −6 dB), "$\Delta_2$: medium" (for example, 0 dB), and "$\Delta_3$: high" (for example, 6 dB), select an appropriate anomaly determination threshold according to the determined level of background noise, and then output the determined level of background noise and the selected anomaly determination threshold as the background noise level information 520.

In addition, the identification network 27 is learned to calculate a cross entropy loss by true/false determination and a cross entropy loss by background noise determination, and minimize these cross entropy losses. As described above, according to the identification network 27 described above, the accuracy of the true/false determination and the background noise determination is improved, and anomaly detection with higher accuracy can be performed at the inference stage.

Next, a configuration of the hierarchical conditional vector according to one embodiment of the present disclosure will be described with reference to FIG. 6.

Figure 6:
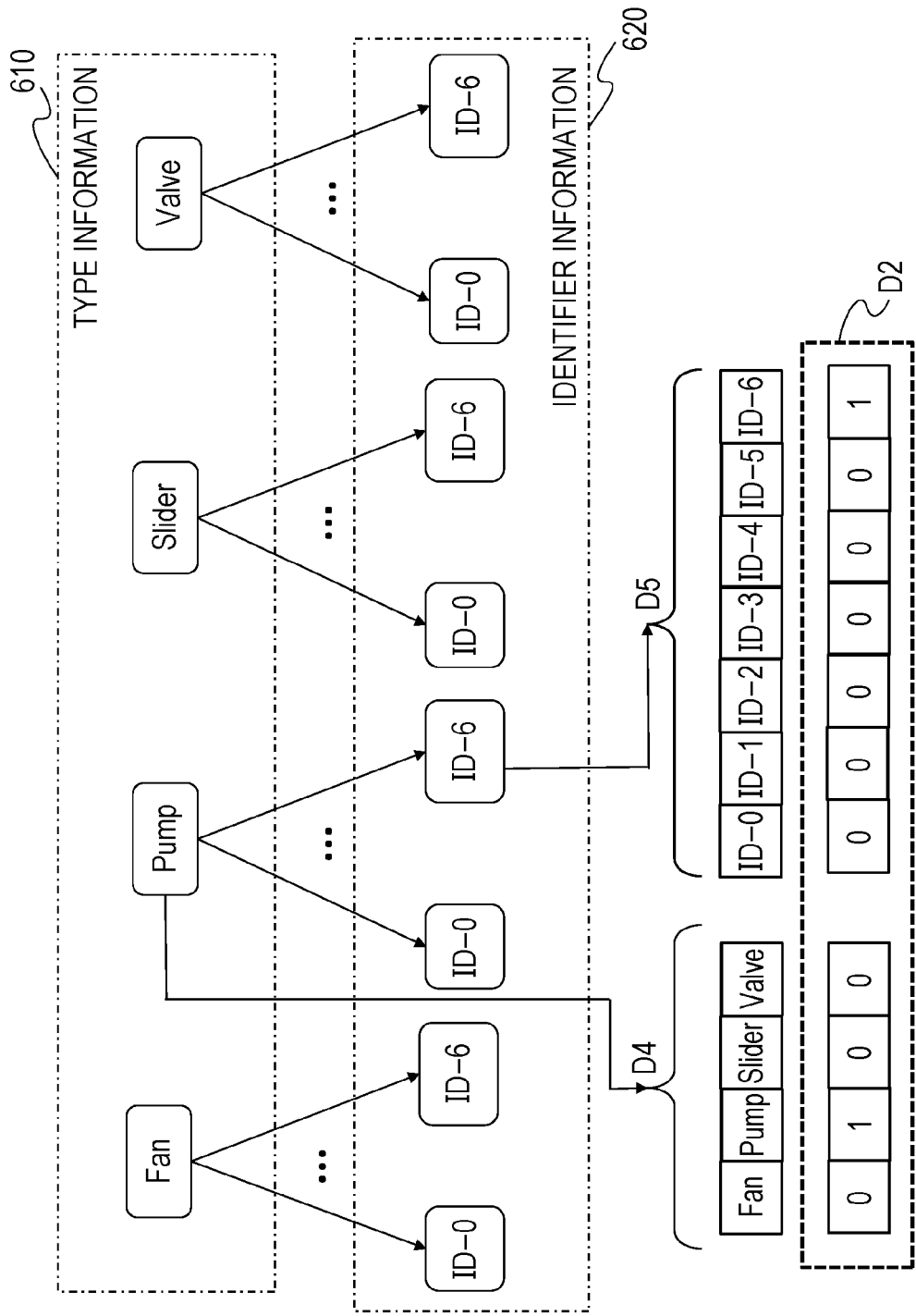
FIG. 6 is a diagram illustrating an example of a configuration of a hierarchical conditional vector according to one embodiment of the present disclosure.

FIG. 6 is a diagram illustrating an example of a configuration of the hierarchical conditional vector D2 according to one embodiment of the present disclosure. As described above, the hierarchical conditional vector D2 in the present disclosure is a data structure including information regarding a predetermined hierarchical condition (for example, the identification information of the device), and by training the hierarchical condition adversarial neural network using the hierarchical conditional vector, a more accurate latent space representation is possible, and a false vector having higher similarity to the true acoustic signal D0 can be generated.

Note that, in the following, a case where the identification information of the device is set as the hierarchical condition will be described as an example, but the present disclosure is not limited thereto, and an appropriate hierarchical condition may be selected according to a field to which the anomaly detection means is applied.

As described above, the hierarchical conditional vector D2 is generated based on the device identification information stored in the device identification database (for example, the device identification DB 16 illustrated in FIGS. 2 and 3). The device identification information includes type information 610 indicating the type of the device and identifier information 620 indicating the identifier of the device as two-level information for identifying the specific device.

More specifically, the type information 610 may include types of devices such as a fan, a pump, a slider, and a valve. In addition, the identifier information 620 may include ID-0 to ID-6 for identifying a specific device for each type of crisis in the type information 610. As a result, an arbitrary device can be uniquely identified by the type information 610 and the identifier information 620 (fan, ID-3, or the like).

The above-described hierarchical conditional vector generation unit (for example, the hierarchical conditional vector generation unit 13 illustrated in FIGS. 2 and 3) may generate the hierarchical conditional vector D2 by a so-called one-hot vector (that is, a vector in which the value of only one element is "1" and the values of the other elements are "0") generation means based on the type information 610 and the identifier information 620.

As illustrated in FIG. 6, the hierarchical conditional vector D2 includes a device type vector D4 indicating the type of the device and a device identification vector D5 indicating the identifier of the device.

In addition, as illustrated in FIG. 6, the device type vector D4 and the device identification vector D5 are vectors in a binary format, the value of the element of the type corresponding to the specific device and the value of the element corresponding to the identifier of the device are "1", and the values of the other elements are "0".

As an example, the device type vector D4 and the device identification vector D5 illustrated in FIG. 6 correspond to a device of which a type is "pump" and an identifier is "ID-6".

By training the hierarchical condition adversarial neural network using the hierarchical conditional vector D2 configured as described above, more accurate latent space representation is possible, and a false vector having higher similarity to the true acoustic signal D0 can be generated.

Next, a logical configuration in a training stage of the anomaly detection apparatus according to one embodiment of the present disclosure will be described with reference to FIG. 7.

Figure 7:
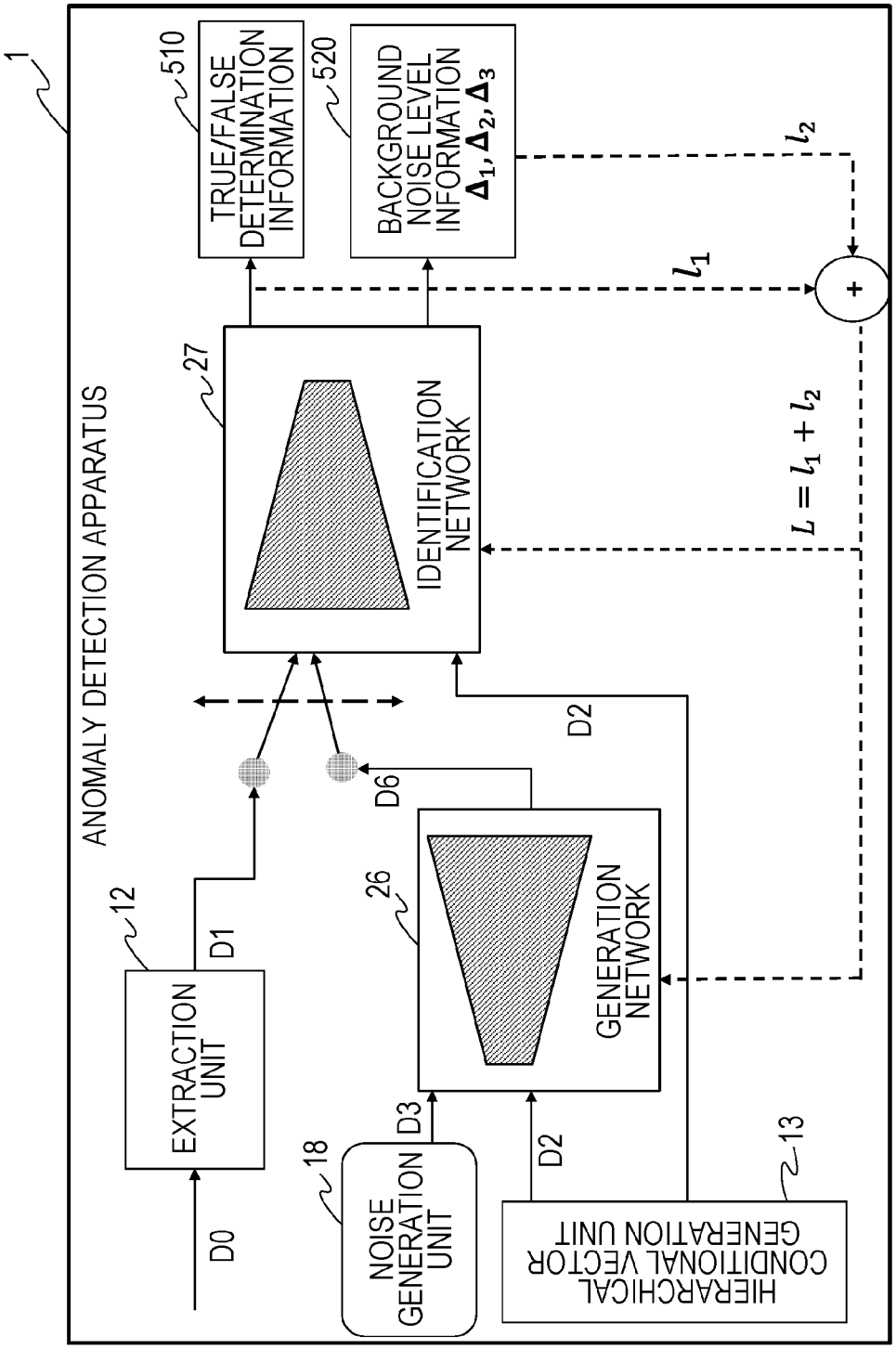
FIG. 7 is a diagram illustrating an example of a logical configuration in a training stage of an anomaly detection apparatus according to one embodiment of the present disclosure.

FIG. 7 is a diagram illustrating an example of a logical configuration at a training stage of the anomaly detection apparatus 1 according to one embodiment of the present disclosure. Here, the training stage is a stage of learning the hierarchical condition adversarial neural network so as to improve the accuracy of the processing of generating the false vector D6 by the generation network 26 and the true/false determination and the background noise determination by the identification network 27.

First, the extraction unit 12 analyzes the acoustic signal D0 acquired from the target device (not illustrated in FIG. 7) to extract the target device feature amount vector D1 indicating the feature amount of the acoustic signal D0. Furthermore, the generation network 26 inputs the noise vector D3 generated by the noise generation unit 18 and the hierarchical conditional vector D2 generated by the hierarchical conditional vector generation unit 13, and generates the false vector D6 approximating the target device feature amount vector D1 based on these vectors D2 and D3.

Next, the identification network 27 inputs the target device feature amount vector D1, the false vector D6, and the hierarchical conditional vector D2 extracted by the extraction unit 12, performs the above-described true/false determination and background noise determination, and thus, outputs the true/false determination information 510 indicating true/false of the target device feature amount vector D1 and/or the false vector D6 and the background noise level information 520 indicating the level of the background noise in the target device feature amount vector D1 and/or the false vector D6.

Next, the identification network 27 calculates a first loss indicating the cross-entropy loss by the true/false determination and a second loss $l_2$ indicating the cross-entropy loss by the background noise determination. Thereafter, the total loss L ($L=l_1+l_2$), which is the sum of the first loss l1 and the second loss l2, is input to the generation network 26 and the identification network 27. The generation network 26 and the identification network 27 update the parameters so as to minimize the total loss L. The updated neural network parameter may be stored in, for example, the above-described learning DB.

Note that the total loss L here may be a weighted average of the first loss $l_1$ and the second loss $l_2$.

In the training stage described above, the generation network 26 and the identification network 27 are learned to minimize the losses of the true/false determination and the background noise determination, thereby improving the processing of generating the false vector D6 by the generation network 26 and the accuracy of the true/false determination and the background noise determination by the identification network 27.

Next, target device feature amount vector generation process by the extraction unit according to one embodiment of the present disclosure will be described with reference to FIG. 8.

Figure 8:
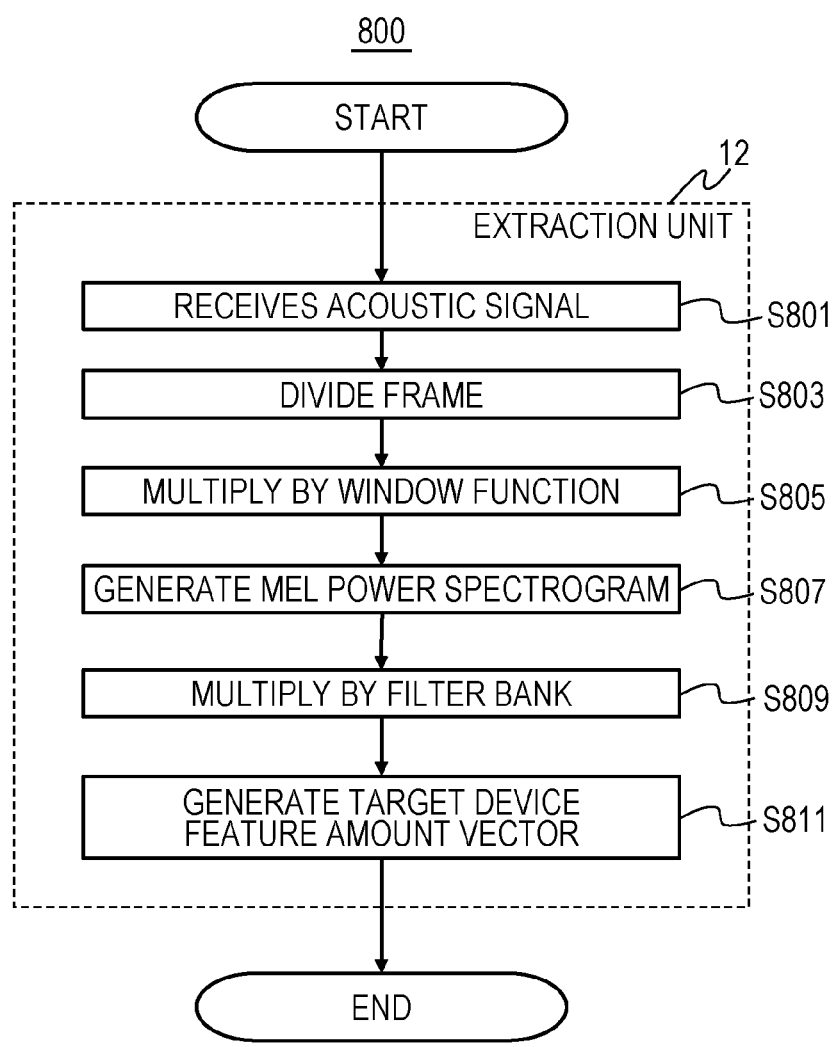
FIG. 8 is a diagram illustrating an example of target device feature amount vector generation process by an extraction unit according to one embodiment of the present disclosure.

FIG. 8 is a diagram illustrating an example of target device feature amount vector generation process 800 by the extraction unit 12 according to one embodiment of the present disclosure. A target device feature amount vector generation process 800 illustrated in FIG. 8 is a process for generating a target device feature amount vector, and is performed by the extraction unit 12.

First, in Step S801, the extraction unit 12 receives the acoustic signal D0 acquired from the target device 3 from the sensor unit, performs analog-digital conversion processing to convert the analog acoustic signal D0 into a digital signal, and then stores the digital signal in a predetermined storage unit (for example, the learning DB 17 illustrated in FIG. 2).

Next, in Step S803, the extraction unit 12 generates a frame signal including a predetermined number of frames by dividing the acoustic signal D0 received in Step S801 and converted into the digital signal based on a predetermined frame size (note that the frames may overlap).

Next, in Step S805, the extraction unit 12 generates a window function multiplication signal by multiplying the frame signal generated in Step S803 by a predetermined window function. The window function here may be, for example, a so-called Hanning window function.

Next, in Step S807, the extraction unit 12 performs short-time Fourier transform on the window function multiplication signal generated in Step S805 to calculate a frequency domain and a power spectrogram of the signal.

As an example, when the frame size of the window function multiplication signal is N, the frequency domain of the signal is a set of M complex numbers, and each complex number in the set of complex numbers corresponds to each of the M frequency bins. Then, the extraction unit 12 calculates the power spectrogram based on the signal in the frequency domain.

Next, in Step S809, the extraction unit 12 generates a mel power spectrogram by multiplying the power spectrogram of the signal generated in Step S807 by a so-called mel filter bank.

Note that, here, the present disclosure is not limited to the mel filter bank, and for example, an arbitrary filter bank such as a ⅓ octave band filter may be used.

Next, in Step S811, the extraction unit 12 applies a predetermined logarithm to the mel power spectrogram generated in Step S809 to generate a logarithmic mel power spectrogram. Then, in the logarithmic mel power spectrogram, the target device feature amount vector D1 is generated by connecting adjacent frames.

According to the target device feature amount vector generation process 800 described above, it is possible to generate the target device feature amount vector D1 input to the hierarchical condition adversarial neural network according to one embodiment of the present disclosure.

Next, hierarchical conditional vector generation process by the hierarchical conditional vector generation unit according to one embodiment of the present disclosure will be described with reference to FIG. 9.

Figure 9:
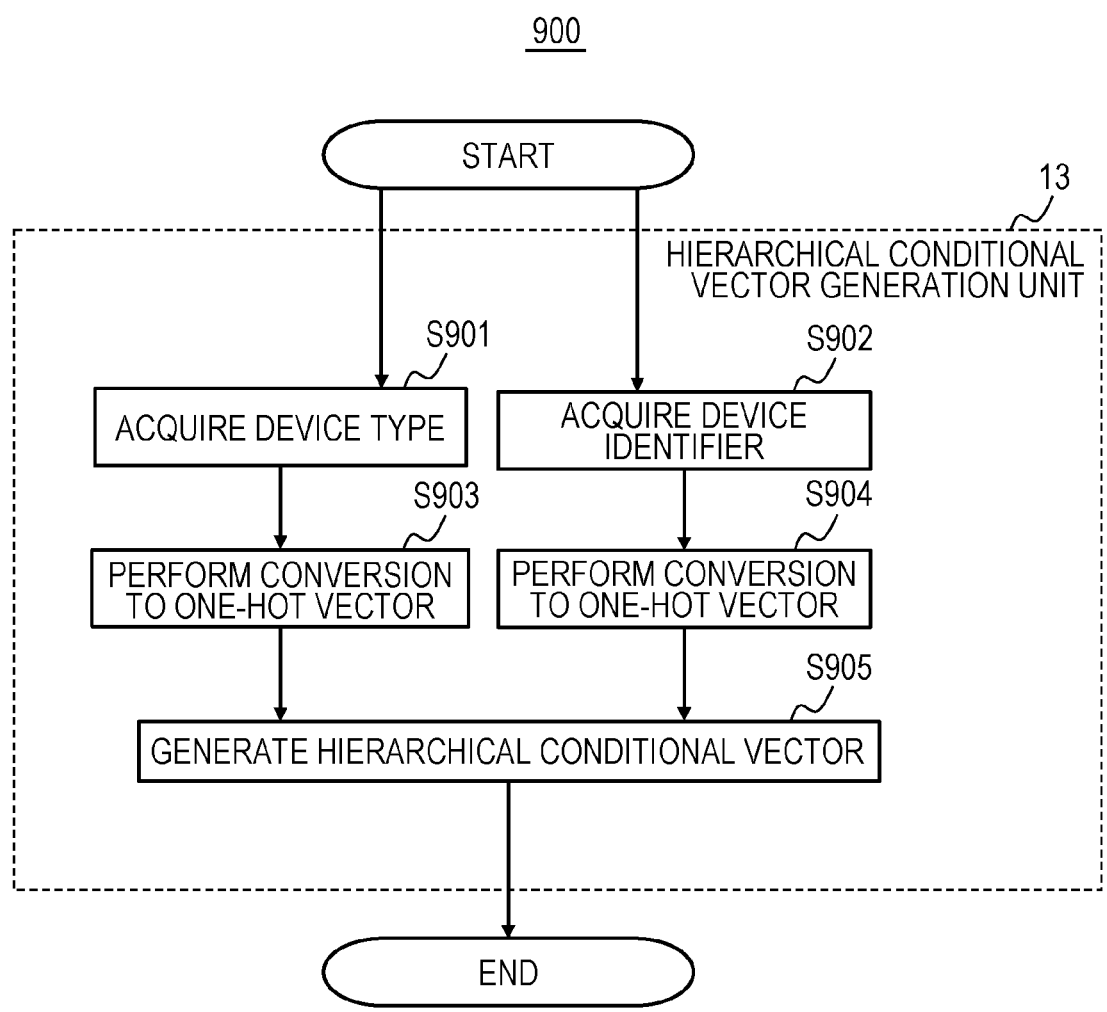
FIG. 9 is a diagram illustrating an example of hierarchical conditional vector generation process by a hierarchical conditional vector generation unit according to one embodiment of the present disclosure.

FIG. 9 is a diagram illustrating an example of a hierarchical conditional vector generation process 900 by the hierarchical conditional vector generation unit according to one embodiment of the present disclosure. The hierarchical conditional vector generation process 900 illustrated in FIG. 9 is a process for generating a hierarchical conditional vector, and is performed by the hierarchical conditional vector generation unit 13.

First, in Steps S901 and S902, the hierarchical conditional vector generation unit 13 acquires the type information and the identifier information on the specific device from the above-described device identification DB (for example, the device identification DB 16 illustrated in FIGS. 2 and 3).

Next, in Step S903, the hierarchical conditional vector generation unit 13 generates the device type vector D4 by performing so-called one-hot vector generation means on the acquired type information.

Next, in Step S904, the hierarchical conditional vector generation unit 13 generates the device identification vector D5 by performing so-called one-hot vector generation means on the acquired identifier information.

Next, in Step S905, the hierarchical conditional vector generation unit 13 generates the hierarchical conditional vector D2 by combining the device type vector D4 generated in Step S903 and the device identification vector D5 generated in Step S904.

According to the hierarchical conditional vector generation process 900 described above, it is possible to generate the hierarchical conditional vector D2 to be input to the hierarchical condition adversarial neural network according to one embodiment of the present disclosure.

Next, a flow of a training stage of the anomaly detection apparatus according to one embodiment of the present disclosure will be described with reference to FIG. 10.

Figure 10:
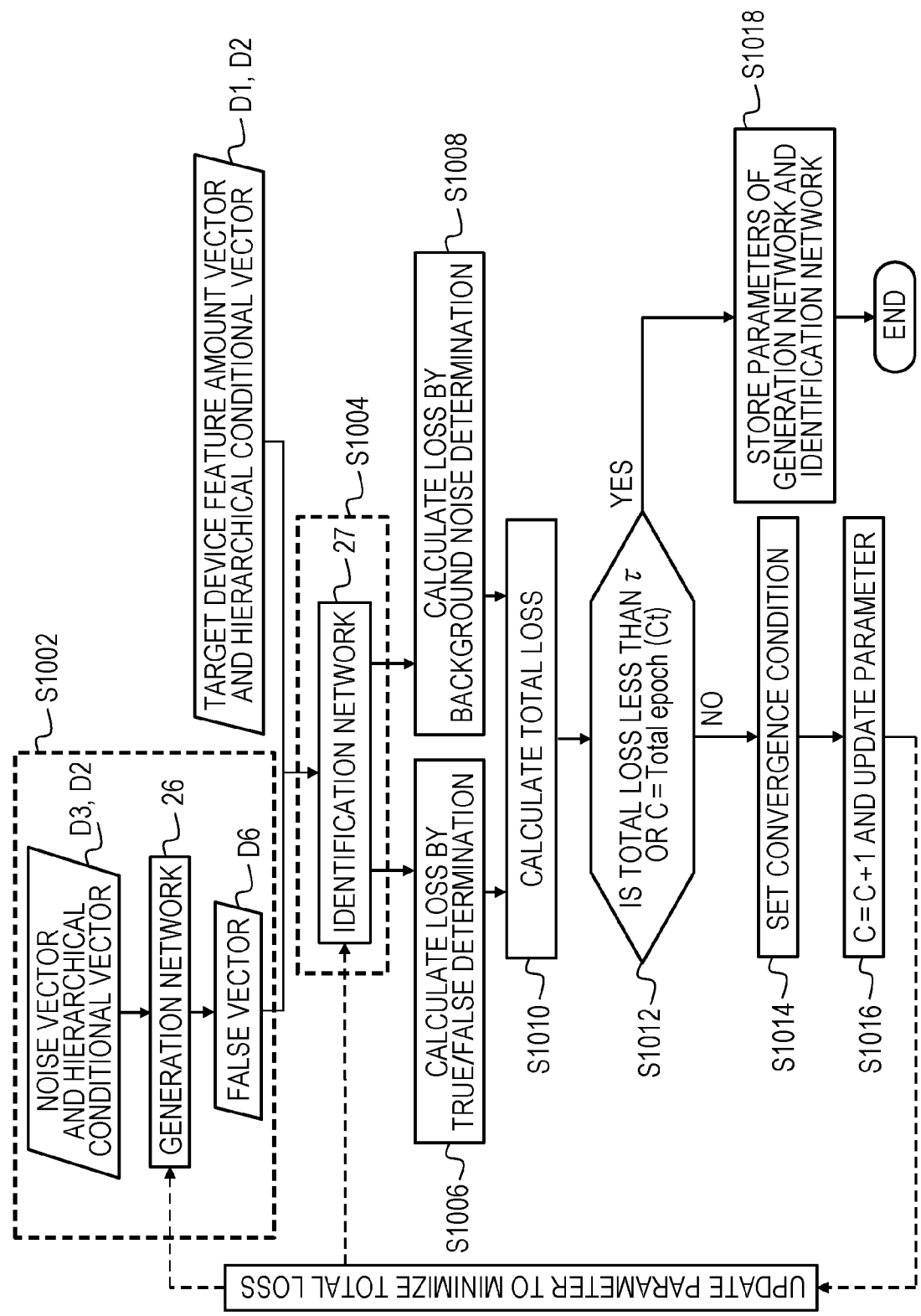
FIG. 10 is a flowchart of a training process illustrating a flow of the training stage of the anomaly detection apparatus according to one embodiment of the present disclosure.

FIG. 10 is a flowchart of a training process 1000 illustrating a flow of a training stage of the anomaly detection apparatus according to one embodiment of the present disclosure. A training process 1000 illustrated in FIG. 10 is a process performed to improve the accuracy of the process of generating a false vector by the generation network and the true/false determination and the background noise determination by the identification network. In addition, the training process 1000 is performed by each functional unit of the anomaly detection apparatus.

First, in Step S1002, the generation network 26 inputs the noise vector D3 generated by the noise generation unit (for example, the noise generation unit 18 illustrated in FIGS. 2 and 3) described above and the hierarchical conditional vector D2 generated by the hierarchical conditional vector generation unit, and generates the false vector D6 approximating the target device feature amount vector D1 based on the vectors D2 and D3.

Next, in Step S1004, the identification network 27 inputs the target device feature amount vector D1 extracted by the extraction unit, the false vector D6 generated by the generation network 26 in Step S1002, and the hierarchical conditional vector D2, and performs the above-described true/false determination and background noise determination, thereby outputting the true/false determination information indicating true/false of the target device feature amount vector D1 and/or the false vector D6 and the background noise level information indicating the level of the background noise in the target device feature amount vector D1 and/or the false vector D6.

Next, in Step S1006, the identification network 27 calculates the first loss $l_1$ indicating the cross entropy loss by the true/false determination.

Next, in Step S1008, the identification network 27 calculates the second loss $l_2$ indicating the cross entropy loss by the background noise determination.

Next, in Step S1010, the identification network 27 calculates the total loss L ($L=l_1+l_2$) that is the sum of the first loss $l_1$ calculated in Step S1006 and the second loss l2 calculated in Step S1008.

Note that the total loss L here may be a weighted average of the first loss $l_1$ and the second loss $l_2$.

Next, in Step S1012, the identification network 27 calculates whether the total loss L calculated in Step S1010 is less than a predetermined convergence condition τ or whether the number of epochs C exceeds a predetermined epoch number upper limit Ct. The convergence condition τ and the epoch number upper limit Ct here may be set by, for example, a user, or may be automatically determined based on past training.

In a case where the total loss L calculated in Step S1010 is less than the convergence condition τ or the epoch number C exceeds the predetermined epoch number upper limit Ct, the processing proceeds to Step S1018. In a case where the total loss L calculated in Step S1010 is equal to or more than the convergence condition τ or the epoch number C does not exceed the predetermined epoch number upper limit Ct, the processing proceeds to Step S1014.

In Step S1014, the identification network 27 sets a new convergence condition. As described above, this new convergence condition may be set by the user, for example, or may be automatically determined based on past training.

In Step S1016, after adding the number of epochs C by 1, the identification network 27 inputs the total loss calculated in Step S1010 to the generation network 26 and the identification network 27. Thereafter, the generation network 26 and the identification network 27 update the parameters of the neural network so as to minimize the total loss L.

In Step S1018, in a case where the total loss L calculated in Step S1010 is less than the convergence condition τ or the epoch number C exceeds the predetermined epoch number upper limit Ct, the training process 1000 ends, and the neural network parameters of the current generation network 26 and identification network 27 are stored in the learning DB (for example, the learning DB 17 illustrated in FIGS. 2 and 3). By setting these neural network parameters in the generation network 26 and the identification network 27, a trained generation network and a trained identification network are obtained.

According to the training process 1000 described above, the generation network 26 and the identification network 27 are learned to minimize the loss of the true/false determination and the background noise determination, thereby improving the accuracy of the process of generating the false vector D6 by the generation network 26 and the true/false determination and the background noise determination by the identification network 27.

Next, a logical configuration in the inference stage of the anomaly detection apparatus according to one embodiment of the present disclosure will be described with reference to FIG. 11.

Figure 11:
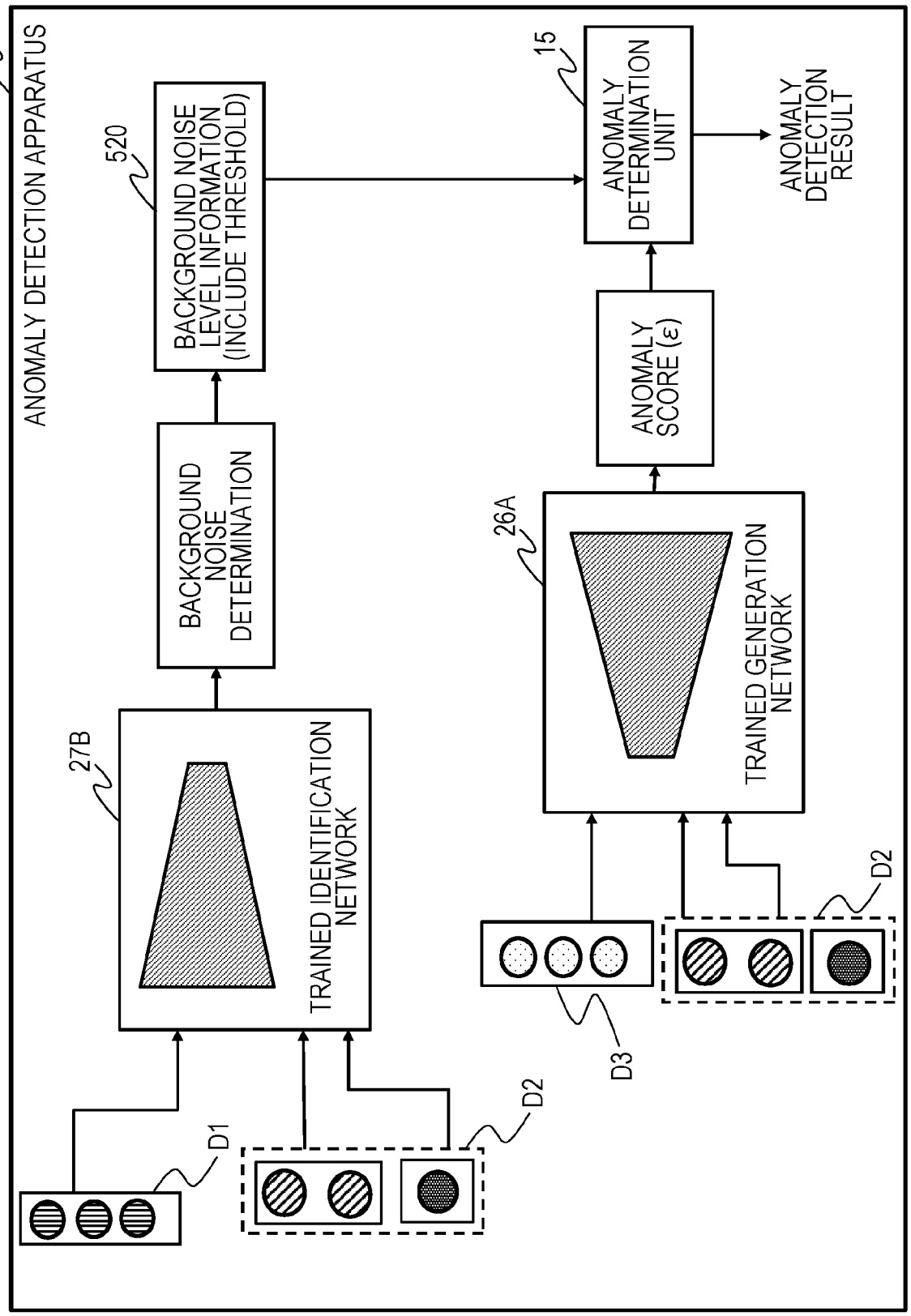
FIG. 11 is a diagram illustrating an example of a logical configuration in an inference stage of the anomaly detection apparatus according to one embodiment of the present disclosure.

FIG. 11 is a diagram illustrating an example of a logical configuration at the inference stage of the anomaly detection apparatus 1 according to one embodiment of the present disclosure. Here, the inference stage is a stage of performing processing of determining the presence or absence of anomaly by analyzing the target device feature amount vector acquired from the verification target device using the trained generation network 26A and the trained identification network 27B obtained by the training process described above.

Note that, in the description of the inference stage, the same terms as those in the training stage described above are used, but the target device, the acoustic signal, the various vectors, and the like in the inference stage may be different from those in the training stage (that is, the hierarchical conditional vector, the target device, the acoustic signal, the target device feature amount vector, the background noise level, the background noise level information, the false vector, and the like described in the training stage are used for training, but in the inference stage, a second hierarchical conditional vector different from the training stage, the second target device, the second acoustic signal, the second target device feature amount vector, the second background noise level information indicating the second background noise level, and the second false vector may be used for inference).

First, the trained identification network 27B inputs the target device feature amount vector D1 indicating the feature amount of the acoustic signal acquired from the target device and the hierarchical conditional vector D2, then performs background noise determination on the target device feature amount vector D1, and generates the background noise level information 520. Here, the trained identification network 27B may select an appropriate anomaly determination threshold according to the noise level in the surrounding environment of the verification target device determined by the background noise determination. The background noise level information 520 may include the determined background noise levels $\Delta_1$, $\Delta_2$, and $\Delta_3$ and the selected anomaly determination thresholds $\eta_1$, $\eta_2$, and $\eta_3$.

Note that selection of the anomaly determination threshold will be described below with reference to FIG. 12, and thus description thereof will be omitted here.

The trained generation network 26A generates the false vector D6 approximating the target device feature amount vector D1 based on the hierarchical conditional vector D2 and the noise vector D3 generated based on the noise signal. Thereafter, the trained generation network 26A calculates the anomaly score for the target device feature amount vector D1 based on the generated false vector D6 and the target device feature amount vector D1.

Here, the anomaly score is a measure indicating the probability that an anomaly exists in the acoustic signal, and may be expressed as a numerical value within a range of 0 to 1, for example. In one embodiment, the anomaly score may be calculated, for example, as an Euclidean distance between the generated false vector D6 and the target device feature amount vector D1, and is obtained by the following Formula 1.

$$\varepsilon = \|X - X'\|_2^2, \quad \text{[Equation 1]}$$

Here, X is the target device feature amount vector D1, and X' is the generated false vector D6.

Next, the anomaly determination unit 15 generates an anomaly detection result indicating whether the target device feature amount vector D1 is normal or abnormal based on the anomaly score $\varepsilon$ calculated by the trained generation network 26A and the anomaly determination threshold included in the background noise level information 520 generated by the trained identification network 27B.

As described above, by analyzing an arbitrary acoustic signal using the trained identification network 27B and the trained generation network 26A, it is possible to generate an anomaly detection result having high robustness in consideration of the type of the verification target device and the background noise of the environment in which the verification target device is disposed.

Next, a relationship between a background noise level and an anomaly determination threshold according to one embodiment of the present disclosure will be described with reference to FIG. 12.

Figure 12:
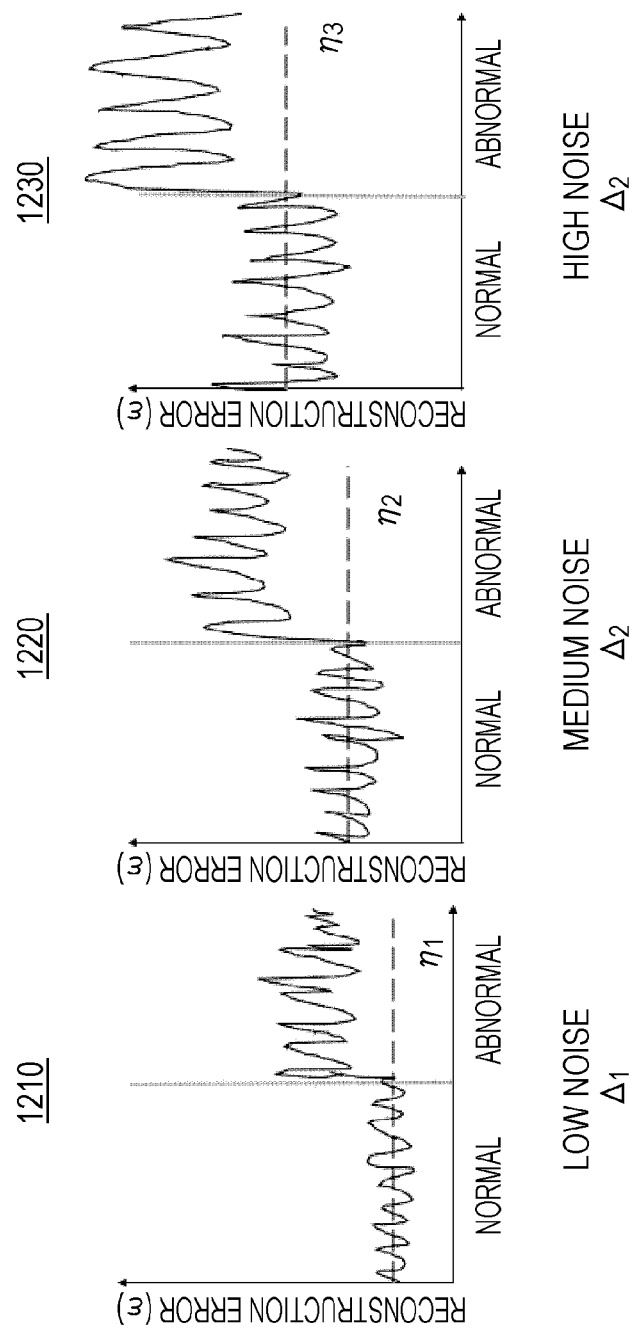
FIG. 12 is an example of a graph illustrating a relationship between a background noise level and an anomaly determination threshold according to one embodiment of the present disclosure.

FIG. 12 is an example of a graph illustrating a relationship between the background noise level and the anomaly determination threshold according to one embodiment of the present disclosure.

As described above, in the present disclosure, the determination as to whether or not an anomaly exists in a predetermined acoustic signal is made based on the anomaly score generated by the hierarchical condition adversarial neural network and the anomaly determination threshold $\eta$ selected according to the background noise level in the acoustic signal.

The anomaly determination threshold $\eta$ here is a value that defines a boundary between the anomaly score determined to be normal and the anomaly score determined to be abnormal, and is selected according to the background noise level in the acoustic signal as described above.

In one embodiment, the anomaly determination threshold may be selected from among three stages: $\eta_1$, $\eta_2$, $\eta_3$ based on background noise levels "$\Delta_1$: low" (for example, −6 dB), "$\Delta_2$: medium" (e.g., 0 dB), and "$\Delta_3$: high" in the acoustic signal.

For example, the anomaly determination threshold $\eta$ may be selected according to the following Formula 2.

$$\eta = \eta_1 \text{ if } \Delta_1,$$

$$\eta_2 \text{ if } \Delta_2,$$

$$\eta_3 \text{ if } \Delta_3. \quad \text{[Equation 2]}$$

After the anomaly determination threshold $\eta$ is set, the determination of the presence or absence of anomaly in the acoustic signal is made based on the relationship between the anomaly determination threshold $\eta$ selected here and the anomaly score $\varepsilon$ generated by the hierarchical condition adversarial neural network.

For example, when it is determined that the background noise level is $\Delta_1$ (low) as a result of the background noise determination described above, the anomaly determination threshold is selected as $\eta_1$. Thereafter, as illustrated in a graph 1210 in FIG. 12, when the anomaly score $\varepsilon$ calculated by the trained generation network described above is less than the anomaly determination threshold of Ili, the signal is determined to be normal, and when the anomaly score $\varepsilon$ is equal to or greater than the anomaly determination threshold of $\eta_1$, the signal is determined to be abnormal.

When the background noise level is determined to be $\Delta_2$ (medium) as a result of the background noise determination described above, the anomaly determination threshold is selected as $\eta_2$. Thereafter, as illustrated in a graph 1220 in FIG. 12, when the anomaly score $\varepsilon$ calculated by the trained generation network described above is less than the anomaly determination threshold of $\eta_2$, the signal is determined to be normal, and when the anomaly score $\varepsilon$ is equal to or greater than the anomaly determination threshold of $\eta_2$, the signal is determined to be abnormal.

Furthermore, as a result of the background noise determination described above, when the background noise level is determined to be $\Delta_3$ (high), the anomaly determination threshold is selected as $\eta_3$. Thereafter, as illustrated in a graph 1230 in FIG. 12, when the anomaly score $\varepsilon$ calculated by the trained generation network described above is less than the anomaly determination threshold of $\eta_3$, the signal is determined to be normal, and when the anomaly score $\varepsilon$ is equal to or greater than the anomaly determination threshold of $\eta_3$, the signal is determined to be abnormal.

As described above, it is possible to generate an anomaly detection result with high robustness in consideration of the type of the verification target device and the background noise of the environment in which the verification target device is disposed by determining whether or not an anomaly exists in a predetermined acoustic signal based on the anomaly score $\varepsilon$ generated by the hierarchical condition adversarial neural network and the anomaly determination threshold $\eta$ selected according to the background noise level in the acoustic signal.

Next, a flow of the inference stage of the anomaly detection apparatus according to one embodiment of the present disclosure will be described with reference to FIG. 13.

Figure 13:
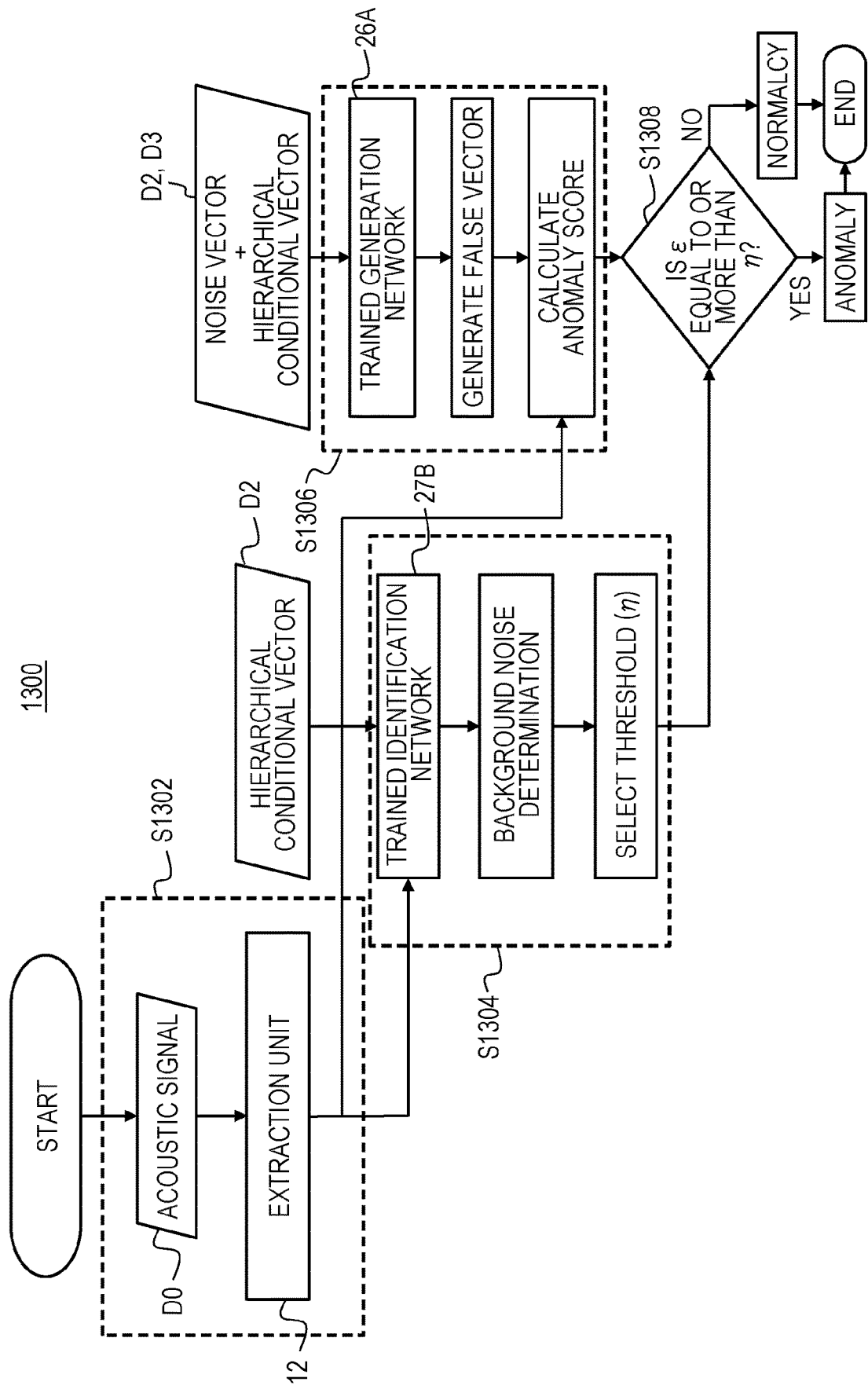
FIG. 13 is a flowchart of an inference process illustrating a flow of the inference stage of the anomaly detection apparatus according to one embodiment of the present disclosure.

FIG. 13 is a flowchart of an inference process 1300 illustrating the flow of the inference stage of the anomaly detection apparatus according to one embodiment of the present disclosure. The inference process 1300 illustrated in FIG. 13 is a process for determining the presence or absence of anomaly by analyzing the target device feature amount vector acquired from the verification target device using the trained generation network and the trained identification network obtained by the training process described above. In addition, the training process 1300 is performed by each functional unit of the anomaly detection apparatus.

First, in Step S1302, the extraction unit 12 inputs and analyzes the acoustic signal D0 acquired from the target device to extract the target device feature amount vector D1 indicating the feature amount of the acoustic signal D0.

Next, in Step S1304, after inputting the target device feature amount vector D1 and the hierarchical conditional vector D2 extracted by the extraction unit, the trained identification network 27B performs background noise determination on the target device feature amount vector D1 and generates background noise level information. This background noise level information may include an optimum anomaly determination threshold $\eta$ (for example, $\eta_1$, $\eta_2$, and $\eta_3$) corresponding to the noise level in the surrounding environment of the verification target device determined by the background noise determination.

Next, in Step S1306, the trained generation network 26A generates the false vector D6 approximating the target device feature amount vector D1 based on the hierarchical conditional vector D2 and the noise vector D3 generated based on the noise signal. Thereafter, the trained generation network 26A calculates the anomaly score $\varepsilon$ for the target device feature amount vector D1 based on the generated false vector D6 and the target device feature amount vector D1.

The calculation of the anomaly score $\varepsilon$ here may be performed, for example, according to the above-described Formula 1.

Next, in Step S1308, the anomaly determination unit generates an anomaly detection result indicating whether the target device feature amount vector D1 is normal or abnormal based on the anomaly score $\varepsilon$ calculated by the trained generation network 26A and the anomaly determination threshold n included in the background noise level information generated by the trained identification network 27B. More specifically, the anomaly determination unit determines whether the anomaly score $\varepsilon$ calculated in Step S1306 is equal to or larger than the selected anomaly determination threshold $\eta$.

When the anomaly score $\varepsilon$ is equal to or larger than the selected anomaly determination threshold $\eta$, the anomaly determination unit determines that an anomaly exists in the acoustic signal D0 and outputs an anomaly detection result indicating that an anomaly exists in the acoustic signal D0. Meanwhile, when the anomaly score $\varepsilon$ is smaller than the selected anomaly determination threshold $\eta$, the anomaly determination unit determines that no anomaly is present in the acoustic signal D0, and outputs an anomaly detection result indicating that no anomaly is present in the acoustic signal D0.

The anomaly detection result output here may be transmitted to, for example, the manager of the target device (the manager of the factory or the like) that becomes a generation source of the acoustic signal D0, or may be transmitted to any third party.

As described above, by analyzing an arbitrary acoustic signal using the trained identification network 27B and the trained generation network 26A, it is possible to generate an anomaly detection result having high robustness in consideration of the type of the verification target device and the background noise of the environment in which the verification target device is disposed.

Although the embodiments of the present invention have been described above, the present invention is not limited to the above-described embodiments, and various modifications can be made without departing from the gist of the present invention.

In the above, a case where various embodiments of anomaly detection according to the embodiments of the present disclosure are applied to an acoustic signal has been described as an example, but the present disclosure is not limited thereto, and may be applied to an arbitrary domain such as an image or a video. Furthermore, the hierarchical condition in the present disclosure may be appropriately selected according to the data set of the domain. By using the hierarchical condition appropriately selected according to the data set of the domain, more accurate latent space representation can be performed in the domain, and the accuracy of anomaly detection can be improved. A predetermined sound, quantization noise, a different illuminance value, or the like may be used as the anomaly determination threshold. In this case, the identification network may be used as a classifier for selecting an appropriate threshold.

What is claimed is:
1. An anomaly detection apparatus comprising:
a device identification database that stores device identification information for identifying a specific device for each type of a device;
one or more processors and one or more non-transitory computer-readable storage media, the non-transitory computer-readable storage media having stored thereon at least:
a hierarchical conditional vector generation unit that generates a hierarchical conditional vector based on the device identification information;

an extraction unit that extracts a target device feature amount vector indicating a feature amount of an acoustic signal acquired from a target device by analyzing the acoustic signal;

a hierarchical condition adversarial neural network that performs background noise determination for determining a background noise level of a surrounding environment of the target device by analyzing the hierarchical conditional vector and the target device feature amount vector, and generates background noise level information indicating the determined background noise level;

a noise generation unit that generates a noise signal and noise vector based on the noise signal, the noise vector being input to the hierarchical condition adversarial neural network; and an anomaly determination unit that determines whether an anomaly exists in the target device feature amount vector by using at least an anomaly determination threshold selected according to the background noise level.

2. The anomaly detection apparatus according to claim 1, wherein the hierarchical condition adversarial neural network includes a generation network that generates a false vector simulating the target device feature amount vector based on the hierarchical conditional vector and on the noise vector, and an identification network that performs a true or false determination to determine true or false status of the target device feature amount vector, generates true or false determination information, performs the background noise determination to determine the background noise level, and generates the background noise level information.

3. The anomaly detection apparatus according to claim 2, wherein the identification network calculates a first loss indicating a cross entropy loss by the true or false determination and a second loss indicating a cross entropy loss by the background noise determination, and uses the first loss and the second loss to train the generation network and the identification network to generate a trained generation network and a trained identification network.

4. The anomaly detection apparatus according to claim 3, wherein the hierarchical conditional vector generation unit generates a second hierarchical conditional vector based on the device identification information, the extraction unit extracts a second target device feature amount vector indicating a feature amount of a second acoustic signal by analyzing the second acoustic signal acquired from a second target device, the trained identification network performs background noise determination of determining a background noise level of a surrounding environment of the second target device by analyzing the second hierarchical conditional vector and the second target device feature amount vector, and generates second background noise level information indicating a second background noise level, and selects a second anomaly determination threshold based on the second background noise level, the trained generation network generates a second false vector simulating the second target device feature amount vector based on the second hierarchical conditional vector and a second noise vector generated based on a baseline acoustic signal of the second target device, and calculates an anomaly score for the second target device feature amount vector based on the second target device feature amount vector and the second false vector, and the anomaly determination unit generates an anomaly detection result indicating whether an anomaly exists in the second target device feature amount vector based on the anomaly score and the second anomaly determination threshold.

5. The anomaly detection apparatus according to claim 1, wherein the hierarchical conditional vector includes type information indicating a type of the device and identifier information indicating an identifier of the device.

6. An anomaly detection method comprising:

generating a first hierarchical conditional vector including type information indicating a type of a device and identifier information indicating an identifier of the device based on device identification information for identifying a specific device for each type of the device;

obtaining a first acoustic signal from a first target device;

extracting a first target device feature amount vector;

generating a first noise signal by a noise generator;

indicating a feature amount of the first acoustic signal by analyzing the first acoustic signal;

generating a first noise vector based on a baseline acoustic signal of the first target device, and the first noise signal;

generating, using a generation network, a first false vector simulating the first target device feature amount vector based on the first hierarchical conditional vector and the first noise vector;

performing true or false determination to determine true or false status of the first target device feature amount vector by using an identification network, and generating true or false determination information;

performing background noise determination to determine a background noise level of a surrounding environment of the first target device by analyzing the first hierarchical conditional vector and the first target device feature amount vector by using the identification network, and generating first background noise level information indicating a first background noise level;

calculating a first loss indicating a cross entropy loss by the true or false determination;

calculating a second loss indicating a cross entropy loss by the background noise determination;

training the generation network and the identification network using the first loss and the second loss to generate a trained generation network and a trained identification network;

generating a second hierarchical conditional vector based on the device identification information;

obtaining a second acoustic signal from a second target device;

extracting a second target device feature amount vector indicating a feature amount of the second acoustic signal by analyzing the second acoustic signal;

generating a second noise vector based on a baseline acoustic signal of the second target device;

performing background noise determination to determine a background noise level of a surrounding environment of the second target device by analyzing the second hierarchical conditional vector and the second target device feature amount vector using the trained identification network, and generating second background noise level information indicating a second background noise level;

generating a second false vector simulating the second target device feature amount vector based on the second hierarchical conditional vector and the second noise vector using the trained generation network;

calculating an anomaly score for the second target device feature amount vector based on the second target device feature amount vector and the second false vector using the trained generation network;

selecting an anomaly determination threshold based on the second background noise level; and generating an anomaly detection result indicating whether an anomaly exists in the second target device feature amount vector based on the anomaly score and the anomaly determination threshold.

7. An anomaly detection system wherein a target device, a sensor unit configured to acquire an acoustic signal from the target device, and an anomaly detection apparatus that analyzes the acoustic signal to determine presence or absence of an anomaly are connected to each other via a communication network, and the anomaly detection apparatus includes:

one or more processors and one or more non-transitory computer-readable storage media, the non-transitory computer-readable storage media having stored thereon at least:

a device identification database that stores device identification information for identifying a specific device for each type of device, a hierarchical conditional vector generation unit that generates a hierarchical conditional vector based on the device identification information, an extraction unit that extracts a target device feature amount vector indicating a feature amount of the acoustic signal by receiving and analyzing the acoustic signal from the sensor unit, a hierarchical condition adversarial neural network that performs background noise determination for determining a background noise level of a surrounding environment of the target device by analyzing the hierarchical conditional vector and the target device feature amount vector, and generates background noise level information indicating the determined background noise level, a noise generation unit that generates a noise signal and noise vector based on the noise signal, the noise vector being input to the hierarchical condition adversarial neural network; and an anomaly determination unit that determines whether an anomaly exists in the target device feature amount vector by using at least an anomaly determination threshold selected according to the background noise level.

8. The anomaly detection system according to claim 7, wherein the hierarchical condition adversarial neural network further includes a generation network that generates a false vector simulating the target device feature amount vector based on the hierarchical conditional vector and a noise vector generated based on a noise signal, and an identification network that performs true or false determination to determine true/false of the target device feature amount vector and the false vector, generates true/false determination information, performs the background noise determination to determine the background noise level, and generates the background noise level information.

9. The anomaly detection system according to claim 8, wherein the identification network calculates a first loss indicating a cross entropy loss by the true or false determination and a second loss indicating a cross entropy loss by the background noise determination, and uses the first loss and the second loss to train the generation network and the identification network to generate a trained generation network and a trained identification network.

10. The anomaly detection system according to claim 9, wherein the hierarchical conditional vector generation unit generates a second hierarchical conditional vector based on the device identification information, the extraction unit extracts a second target device feature amount vector indicating a feature amount of a second acoustic signal by analyzing the second acoustic signal acquired from a second target device, the trained identification network performs background noise determination of determining a background noise level of a surrounding environment of the second target device by analyzing the second hierarchical conditional vector and the second target device feature amount vector, and generates second background noise level information indicating a second background noise level, and selects an anomaly determination threshold based on the second background noise level, the trained generation network generates a second false vector simulating the second target device feature amount vector based on the second hierarchical conditional vector and a second noise vector generated based on a baseline acoustic signal of the second target device, and calculates an anomaly score for the second target device feature amount vector based on the second target device feature amount vector and the second false vector, and the anomaly determination unit generates an anomaly detection result indicating whether an anomaly exists in the second target device feature amount vector based on the anomaly score and the anomaly determination threshold.

11. The anomaly detection system according to claim 7, wherein the hierarchical conditional vector includes type information indicating a type of the device and identifier information indicating an identifier of the device.

* * * * *